March 22, 1932. O. A. FREDERICKSON 1,850,792
CONNECTER FITTING AND BUSHING FOR ARMORED CABLES
Filed April 9, 1930
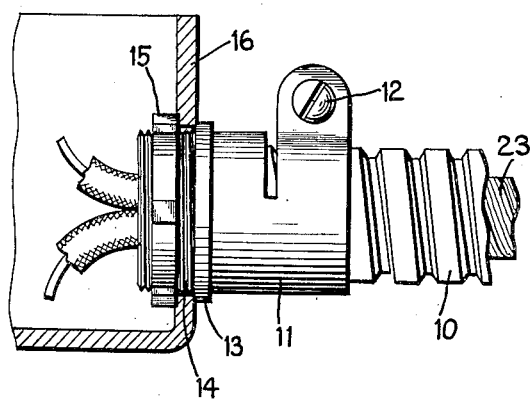
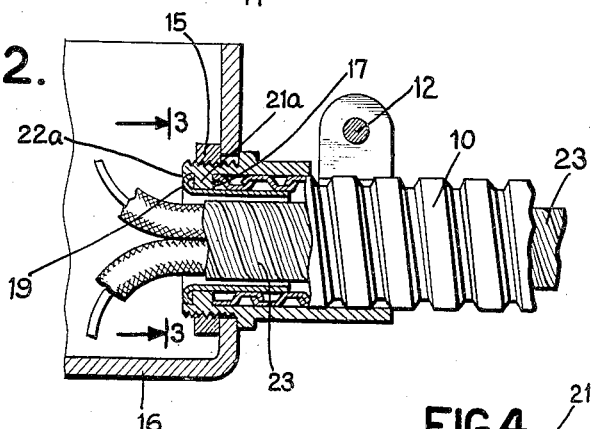
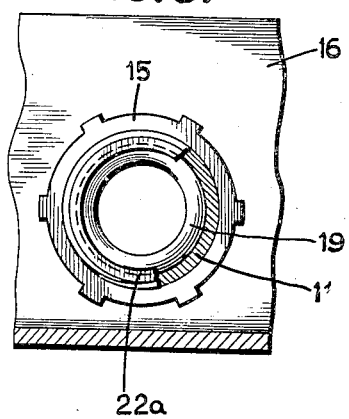
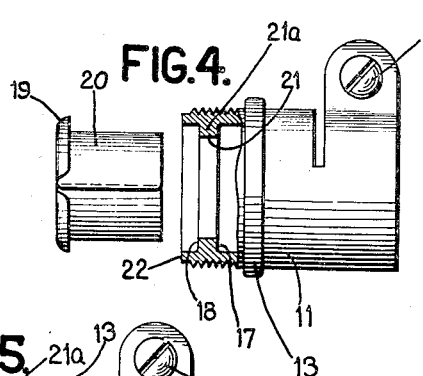
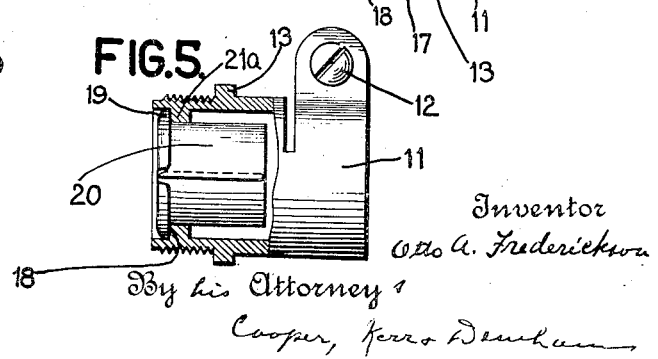
Inventor
Otto A. Frederickson
By his Attorney
Cooper, Kerr & Denham Patented Mar. 22, 1932

1,850,792

UNITED STATES PATENT OFFICE

OTTO A. FREDERICKSON, OF BEN AVON, PENNSYLVANIA, ASSIGNOR TO NATIONAL ELECTRIC PRODUCTS CORPORATION, OF NEW YORK, N. Y., A CORPORATION OF DELAWARE

CONNECTER FITTING AND BUSHING FOR ARMORED CABLES

Application filed April 9, 1930. Serial No. 442,734.

This invention relates to an improved clamp or connecter fitting for armored cable, in which an insulating bushing is incorporated in and carried by the clamp for cooperation with the cable.

In the electrical arts in the use of armored cable, the sharp ends of the armor tend to cut through the insulation of the conductors and accordingly it has now become quite a general practice to utilize insulating bushings which fit inside the armor and between the armor and the conductors. Such bushings are provided with curled lip portions which afford protection over the sharp ends of the armor. When armored cables equipped with such bushings are disposed in clamping devices or connecter fittings in electrical outlet boxes or the like, difficulties are experienced in making sure that the bushings are not either wholly lacking or that the bushings are misplaced. This is true because the bushings themselves are disposed within and concealed by the clamping device or connecter fitting. Accordingly clamps have been proposed heretofore in which inspection openings have been provided in the clamps or connecter fittings to provide for the inspection of the bushings in situ.

The present invention relates to an improved construction of combined connecter fitting or clamp and bushing by which an end of a length of armored cable may be both bushed and properly clamped without the necessity of providing inspection apertures in the clamp.

The present invention has also for one of its objects the provision of a construction of clamp or connecter fitting which is adapted to support and carry an insulating bushing in proper relation to enter the inside of an armored cable which is entered into and secured by the clamping element of the clamp or connecter fitting.

A further object of the present invention resides in the provision of a novel construction for properly and accurately bushing an armored cable and for clamping the same.

Further and other objects of the present invention will be hereinafter set forth in the accompanying specification and claims and shown in the drawings which by way of illustration show what I now consider to be preferred embodiments of the invention.

In the drawings:

Figure 1 is a view of an outlet box with an associated connecter fitting and armored cable entered and secured therein;

Fig. 2 is a detail sectional view of the parts shown in Fig. 1 and this figure shows the insulating bushing and the means for retaining the same in the connecter fitting;

Fig. 3 is an end view taken substantially on line 3—3 of Fig. 2 but with the conductors omitted; and Figs. 4 and 5 show successive steps in the assembly of the bushing in the connecter fitting.

Referring to Fig. 1 10 is an armored cable, the part designated 11 generally designates the connecter fitting which is of the well known split type provided with a usual clamping means 12 with a shouldered portion 13 and a threaded portion 14. A nut 15 secures the connecter fitting in the usual way in an opening in an outlet box 16. As shown in Figs. 2, 3 and 4, the connecter fitting 11 is provided with an interior shouldered portion 17 against which the armor of the cable abuts when it is introduced into the connecter fitting (see Fig. 2). The connecter fitting is also provided with another shouldered portion 18 which forms an abutment for the curled lip portion 19 of the insulating bushing 20. The shank of the insulating bushing 20 fits snugly in the bore 21 of the connecter fitting. After the bushing is introduced into the connecter fitting and with the lip portion 19 abutting the shoulder 18, the end portion 22 of the connecter fitting is beaded over as shown in Fig. 2 at 22a. The connecter fitting 11 thus is provided with the insulating bushing 20 which is fixedly secured to it.

When the connecter fitting and bushing construction is to be used with an armored cable, the armored cable is introduced into the connecter fitting until the armor abuts shoulder 17. The shank of the bushing then projects into the inside of the armor and between the armor and the conductors thus providing proper insulation. The beaded over portion 19 of the bushing affords protection to the insulation upon the conductors.

As shown in Fig. 2, the individual insulating conductors are wrapped with a paper wrapping 23. In practice this paper wrapper may be stripped back from the ends of the insulated conductors within the armor to provide space between the conductors and the armor for the reception of the bushing if the insulated conductors snugly fit the interior of the bushing. In Fig. 2, this wrapping 23 is not shown stripped back but it is obvious that it can be stripped back if dimensions of the conductor require it.

It will be appreciated that the combined assembly of bushing and fitting provides a construction in which the bushing will always properly bush the armored cable. It is only necessary to insert the armor into the socket or bored out portion of the fitting and the shank of the bushing will then telescope within the armor in proper relation. The intermediate portion 21a serves to provide by its shoulders 17 and 18 an abutment for the armor and a seat for the lip portion of the bushing and the annular bored portion 21 acts as a guide for the shank of the bushing.

I claim:

1. A combined connecter fitting and insulating bushing, said insulating bushing having a lip portion and an annular shank portion and being secured in the connecter fitting so that the annular shank portion of the bushing extends within the armor of an armored cable which is inserted in the connecter fitting, said bushing and fitting including cooperating parts to secure the bushing within the fitting against dislodgment therefrom before the armored cable is introduced into the fitting whereby a unitary assembly of the fitting and bushing is maintained, said connecter fitting being provided with a beaded over portion which extends over the lip portion of the bushing to hold the same in position in the connecter fitting, and an annular shoulder provided within the fitting to serve as a securing abutment for the other side of the lip of the bushing.

2. An armored cable connecter fitting and clamping device, having a bushing of insulating material provided with a lip-like edge associated therewith and carried thereby, said fitting having an intermediate shouldered portion intermediate its ends to provide an abutment for the end of the armor of an armored cable inserted in the clamp and to provide a recess and abutment for the lip portion of the insulating bushing.

In testimony whereof I hereto affix my signature.

OTTO A. FREDERICKSON.